(12) United States Patent
Itoh et al.

(10) Patent No.: US 8,294,765 B2
(45) Date of Patent: Oct. 23, 2012

(54) VIDEO IMAGE MONITORING SYSTEM

(75) Inventors: Masaya Itoh, Hitachinaka (JP);
Masanori Miyoshi, Mito (JP); Masato Kazui, Sapporo (JP); Hiromasa Fujii, Kawasaki (JP); Shun'ichi Kaneko, Sapporo (JP); Hidenori Takauji, Sapporo (JP)

(73) Assignee: Hitachi, Ltd., Tokyo (JP)

( * ) Notice: Subject to any disclaimer, the term of this patent is extended or adjusted under 35 U.S.C. 154(b) by 284 days.

(21) Appl. No.: 12/714,655

(22) Filed: Mar. 1, 2010

(65) Prior Publication Data

US 2010/0253779 A1    Oct. 7, 2010

(30) Foreign Application Priority Data

Mar. 2, 2009 (JP) ................................ 2009-048529

(51) Int. Cl.
*H04N 7/18* (2006.01)
(52) U.S. Cl. ......... 348/143; 348/142; 375/343; 375/346
(58) Field of Classification Search .................. 348/143, 348/142; 375/343, 346
See application file for complete search history.

(56) References Cited

U.S. PATENT DOCUMENTS

| | | | | |
|---|---|---|---|---|
| 5,767,922 | A * | 6/1998 | Zabih et al. | 348/700 |
| 7,324,594 | B2 * | 1/2008 | Lamboray et al. | 375/240.03 |
| 7,428,345 | B2 * | 9/2008 | Caspi et al. | 382/294 |
| 7,639,840 | B2 * | 12/2009 | Hanna et al. | 382/103 |
| 7,813,822 | B1 * | 10/2010 | Hoffberg | 700/94 |
| 8,063,920 | B2 * | 11/2011 | De Haan et al. | 345/690 |
| 8,081,224 | B2 * | 12/2011 | Lin | 348/208.99 |
| 2002/0120594 | A1 * | 8/2002 | Pirim | 706/20 |
| 2004/0119819 | A1 * | 6/2004 | Aggarwal et al. | 348/143 |
| 2005/0002572 | A1 * | 1/2005 | Saptharishi et al. | 382/224 |

(Continued)

FOREIGN PATENT DOCUMENTS

JP    2002-344960    11/2002

OTHER PUBLICATIONS

Hidenori Takauji et al.; A Fast Tag Searching Method based on Orientation Code Entropy and Density, Proc. of SPIE, 2005, vol. 6051, pp. 605103-1-605103-12.

Farhan Ullah et al.; Orientation Code Matching for Robust Object Search, IEICE Trans, Inf. & Syst., Aug. 2001, pp. 999-1006, vol. E84-D, No. 8.

*Primary Examiner* — John Follansbee
*Assistant Examiner* — Anthony Mejia
(74) *Attorney, Agent, or Firm* — Antonelli, Terry, Stout & Kraus, LLP.

(57) ABSTRACT

This is a video image monitoring system which can effectively detect a mobile object appearing in a captured video image even if a background image and other camera condition change continuously. The video image monitoring system comprises: a video-image-capturing section 100 for putting out image data based on a video image signal obtained by using a camera 10; a mobile-object-candidate-area-detecting section 101 for extracting a candidate area of a mobile object from the image data; and a mobile-object-detecting section 102 for determining whether the candidate area is the mobile object. The mobile-object-candidate-area-detecting section 101 quantizes a brightness gradient direction of the image data, and calculates a spatio-temporal histogram which represents the frequency of a direction code appearing in a predetermined spatio-temporal space. After that, the mobile-object-candidate-area-detecting section 101 calculates a statistical spatio-temporal space evaluation value of the spatio-temporal histogram. The mobile-object-detecting section 102 uses the spatio-temporal space richness to determine whether the candidate area is the mobile object.

5 Claims, 8 Drawing Sheets

U.S. PATENT DOCUMENTS

2006/0045354 A1* 3/2006 Hanna et al. .................. 382/224
2006/0072663 A1* 4/2006 Li et al. .................... 375/240.16
2009/0033745 A1* 2/2009 Yeredor et al. ................ 348/152
2011/0310996 A1* 12/2011 Raleigh et al. ................ 375/295

* cited by examiner

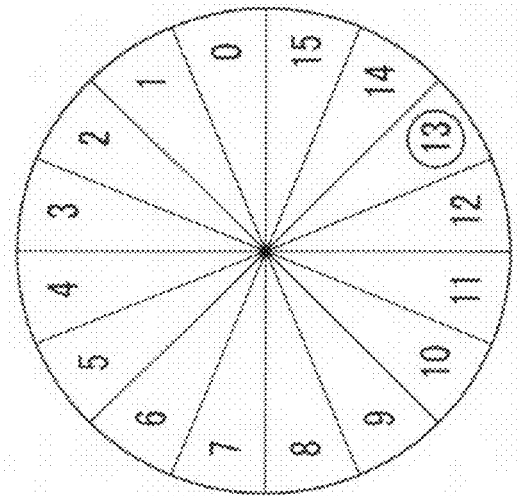
FIG. 4D
DIRECTION CODES
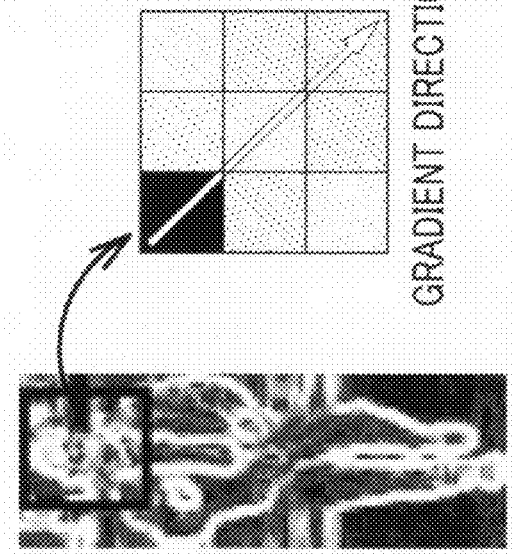
FIG. 4C
GRADIENT DIRECTION
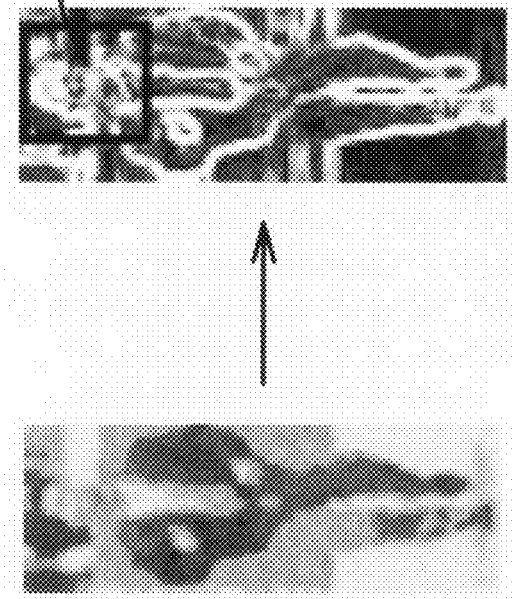
FIG. 4B
FIG. 4A FIG.6A    AREA IN WHICH MOBILE OBJECT APPEARS
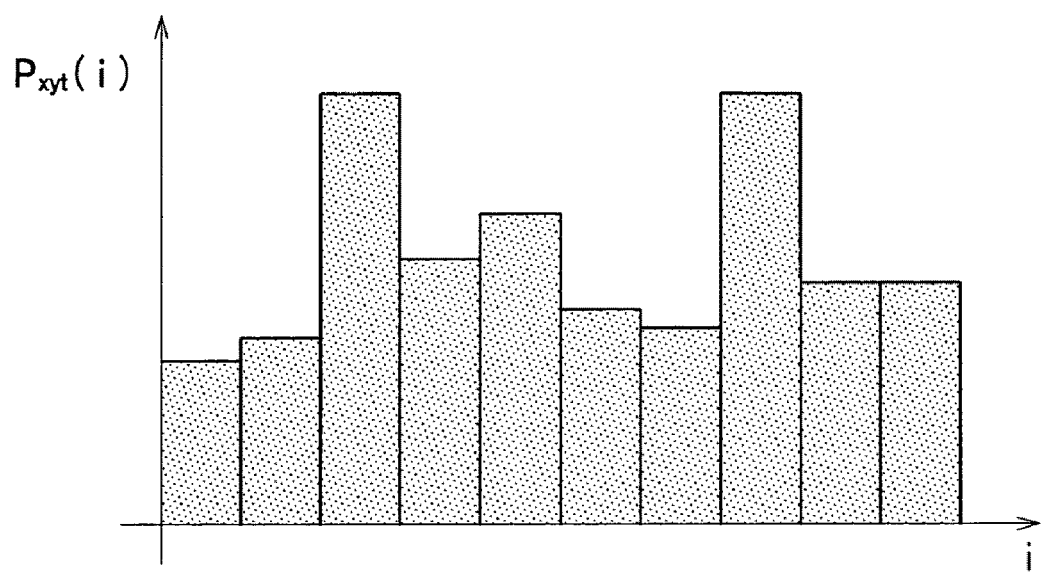
FIG.6B    BACKGROUND AREA
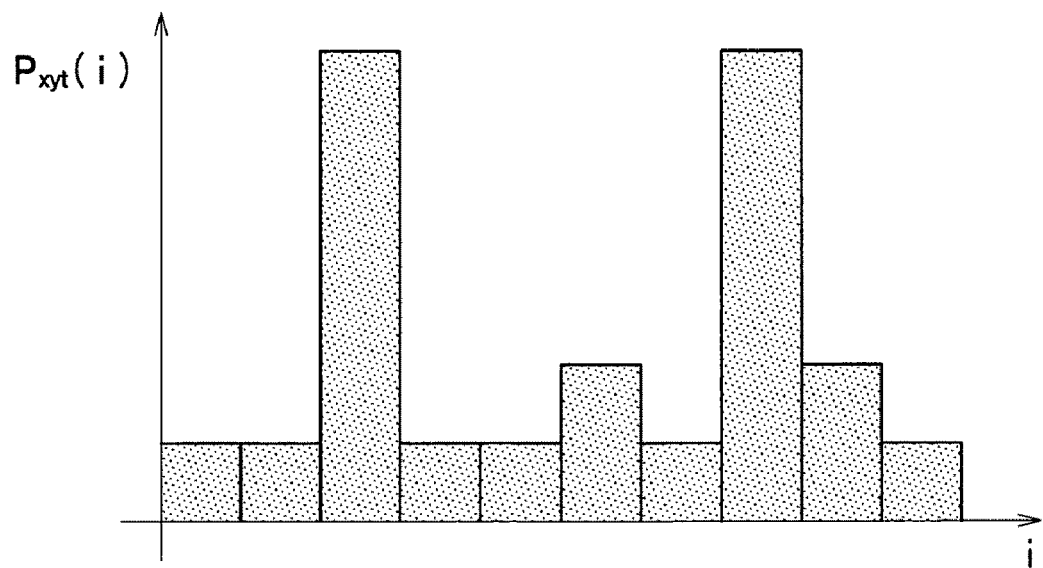

VIDEO IMAGE MONITORING SYSTEM

CROSS REFERENCE TO RELATED APPLICATION

The present patent application claims the benefit under 35 U.S.C. 119 of Japanese Patent Application No. 2009-048529 filed on Mar. 2, 2009, the disclosure of which is incorporated into this patent application by reference.

TECHNICAL FIELD

The present invention relates to a video image monitoring system having functions of: recording image data converted from a video image obtained by using an image-capturing device such as a camera used with a video recording device, a monitoring device, or a mobile robot; detecting a trespasser by using an image recognition method; and detecting a person who approaches the mobile robot. In particular, the present invention relates to a video image monitoring system superior in detecting a mobile object if an image-capturing device is movable.

BACKGROUND ART

A video image monitoring system has functions of conducting an image processing on a video image obtained by an image-capturing device such as a camera etc.; and detecting a mobile object such as a person or a vehicle appearing in a monitored area. The video image monitoring system of this kind has various functions of recording only a video image in which a mobile object appears therein; displaying a warning icon on a display device; and giving an alarm to a security personnel by sounding an alarm etc. The video image monitoring system of this kind also lowers the workload of security personnel in a monitoring operation, which formerly required continuous observation. In addition, the video image recorded by using the video image monitoring system of this kind can be used for investigating a criminal act such as theft, or an illegitimate act.

Recently, more and more image monitoring systems are introduced in mass merchandisers, financial institutions, buildings, and offices, since awareness of crime prevention increases in society because of crime rate growth, expansion of crime patterns, and lowering criminal arrest rate. More and more cameras are installed at various locations since the storage capacity of a video recording device increases and since network cameras are widely used. There is a growing demand for a surveillance assist function since it is too burdensome for a security personnel to monitor a recorded video image continuously to find out a criminal act etc. as previously explained.

In addition, the video image monitoring system has expanded its scope of application into combined use with a pan, tilt, zoom (PTZ) camera, having a zoom lens unit and mounted on a camera platform capable of being rotated and tilted, for tracking a trespasser, or with a camera mounted on a mobile robot etc. for the purpose of visual recognition. However, these applications have a problem since not only an object to be monitored but also a background moves in the field view of a camera if the camera is moved. In a known image recognition processing method which is ordinarily employed for a fixed camera for detecting a mobile object, a reference background image is produced at first, and then, a difference between the reference background image and an image input anew is calculated.

A conventionally known image-processing device (see Patent Document 1) detects changes among images produced from a video image captured by the PTZ camera, and then, estimates a camera framing based on the result of the detection. The previously produced images are transformed based on the estimated camera framing, and then, images of a mobile object is extracted by using the transformed images and the video image captured by the camera. The image-processing device conducts an image recognition process to the extracted images of the mobile object.

In addition, an image-processing operation must be stable against a varying brightness or noise when the image-capturing condition varies, e.g. in an outdoor. A known method disclosed in Non-Patent Document 1 is robust against the varying brightness since brightness gradients in the images are encoded to direction code data in this method.

PRIOR ART DOCUMENT

Patent Document

[Patent Document 1] Japanese Patent Laid-open Publication No. 2002-344960

Non-Patent Document

[Non-Patent Document 1] ULLAH Farhan et al. "Orientation Code Matching for Robust Object Search (Special Issue on Image Recognition and Understanding)", IEICE transactions on information and systems, Vol. E84-D, No. 8(20010801), pp. 999-1006, Aug. 1, 2001, The Institute of Electronics, Information and Communication Engineers

DISCLOSURE OF THE INVENTION

Problems to be Solved by the Invention

To summarize, the image-processing device disclosed in Patent Document 1 reconstructs the reference background image by using the video image captured by the PTZ camera and information regarding the panning movement of the PTZ camera. However, the image-processing device disclosed in Patent Document 1 has a problem that the workload is extremely large for reconstructing the background images by transforming the previously obtained images. In addition, the image-processing operation can be conducted with the image-processing device disclosed in Patent Document 1 only if the information of rotation and tilt of the panning movement of the PTZ camera is available. A possible cost increase is another problem in the video camera system.

In addition, it is difficult to use the method disclosed in the Non-Patent Document 1 in conditions where an image capture condition dynamically changes, since this method is applicable only to a pre-fixed camera for the purpose of image identification with a predetermined template or inspection purpose.

An object of the present invention is to provide a video image monitoring system which can detect a mobile object appearing in a captured video image by controlling a background image and a camera condition which change continuously.

Means for Solving Problem

In order to solve the aforementioned problem, a video image monitoring system according to the present invention includes: a mobile-object-detecting section for detecting a mobile object from a video image signal obtained by using an image-capturing device such as a camera etc.; a recording section for recording information of the mobile object being detected by the mobile-object-detecting section and a video image captured by using a video-image-capturing section in a recording medium; an output section for outputting the result of the information of the mobile object detected by the mobile-object-detecting section; a direction code calculation section for calculating a direction code obtained by a mobile-object-candidate-area-detecting section which quantizes a brightness gradient direction of an image inputted thereinto, the mobile-object-candidate-area-detecting section being connected upstream of the mobile-object-detecting section; a spatio-temporal histogram calculation section for calculating a spatio-temporal histogram which represents a frequency of a plurality of images and of the direction code calculated in a predetermined space; and a spatio-temporal space evaluation criteria calculation unit for calculating a statistic spatio-temporal space evaluation criteria of the spatio-temporal histogram. The video image monitoring system according to the present invention can determine whether the mobile-object-candidate is the mobile object from the spatio-temporal space evaluation criteria.

Effect of the Invention

The present invention can provide a video image monitoring system which can detect a mobile object appearing in a captured video image by controlling a background image and other camera condition which change continuously and by adopting a spatio-temporal space richness for calculating the change in the direction code in the spatio-temporal space.

BRIEF DESCRIPTION OF DRAWINGS

FIGS. 4A to 4D show a method of direction encodement.
FIG. 4A shows an original image.
FIG. 4B shows an image which was filtered by an edge enhancement filter.
FIG. 4C shows a brightness gradient direction of the image shown in FIG. 4B.
FIG. 4D shows a direction code allocated in the brightness gradient direction shown in FIG. 4C.
FIGS. 6A and 6B show an example of a spatio-temporal histogram according to the present embodiment.
FIG. 6A shows a spatio-temporal histogram of an area in which a mobile object appears.
FIG. 6B shows a spatio-temporal histogram of a background area.

EMBODIMENTS FOR CARRYING OUT THE INVENTION

In the following, an embodiment of the present invention will be explained in detail with reference to the accompanying drawings.

Figure 1:
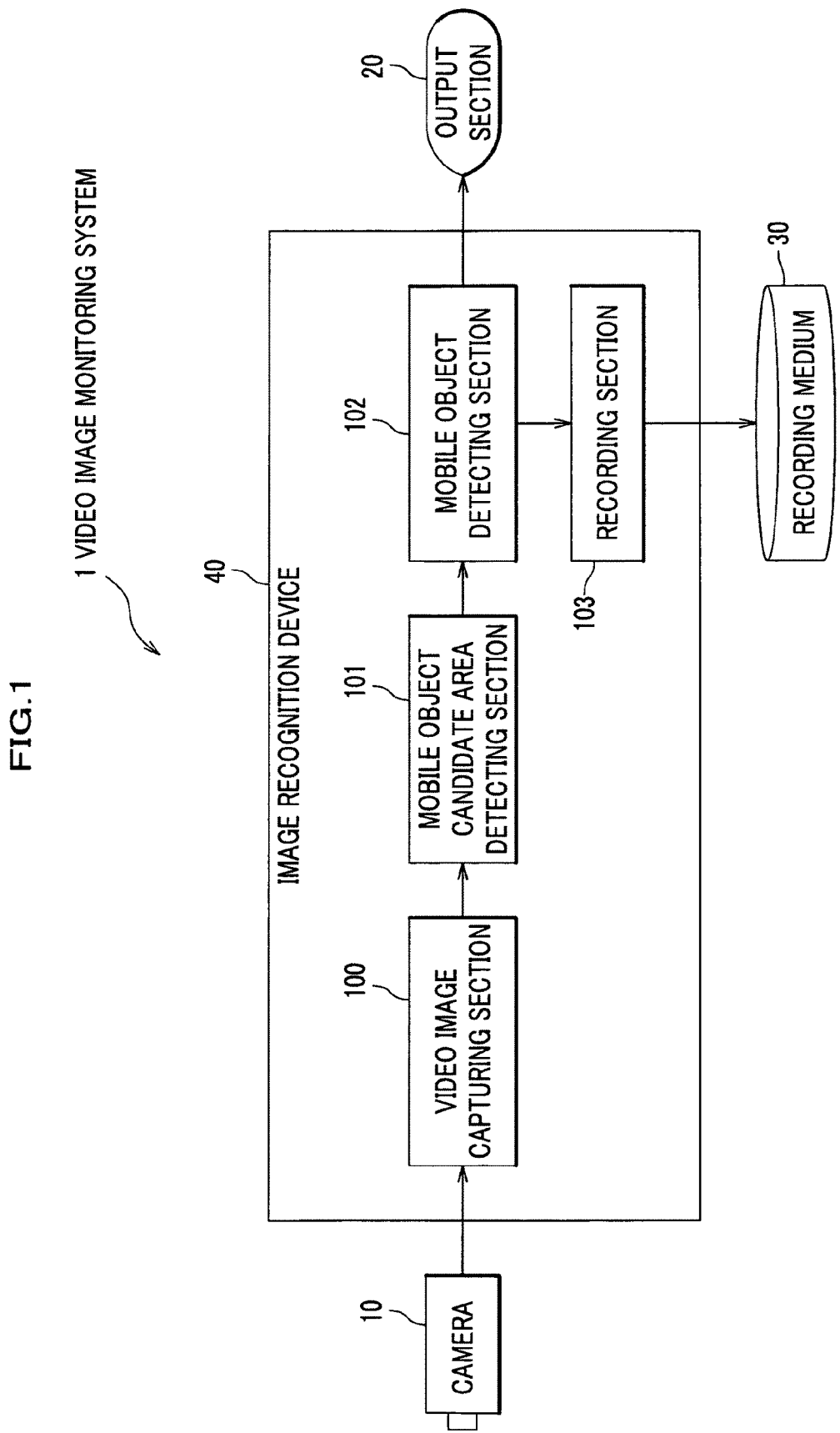
FIG. 1 is a block diagram showing a video image monitoring system of one embodiment of the present invention.

FIG. 1 is a block diagram showing a video image monitoring system 1 according to one embodiment of the present invention.

The video image monitoring system 1 includes a camera 10, an output section 20, a recording medium 30, and an image recognition device 40. More specifically, in this video image monitoring system 1, an electronic calculator system is applied to a system including the camera 10, the recording medium 30, and the output section 20. The hardware of the electronic calculator system includes CPUs, memories, and input/output interfaces etc., into which predetermined software is installed to provide functions described in block diagrams shown in the accompanying drawings.

The camera 10 is an image-capturing device which includes a camera lens having a zoom function; and an image-capturing element such as a complementary metal oxide semiconductor (CMOS) or a charge coupled device (CCD), neither of which are shown in the drawings. The camera 10 captures a video image and puts out the video image to a video-image-capturing section 100, which will be explained later, of the image recognition device 40. This camera 10 is a PTZ camera mounted on a camera platform which can be panned, tilted, and shifted.

The recording medium 30 may be an electronic recording medium such as a hard disk drive unit and a flash memory etc. The recording medium 30 may be another data recording medium such as a magnetic tape storage device etc.

Parameter information and image information obtained by the image recognition device 40 are added to the video image captured by the camera 10, and then, the image and the information are stored in the recording medium 30.

The output section 20 is a display device such as a liquid crystal display device or a cathode ray tube (CRT) display device etc. Instead of using the output section 20, the video image monitoring system 1 may have another data output configuration such as red-green-blue (RGB) monitoring or data networking etc. Parameters are set by using a user interface. The user interface useable for the output section 20 includes an input device such as a mouse or a keyboard (not shown in the drawings), into which a user can put in various parameters.

The image recognition device 40 will be explained next in detail.

The image recognition device 40 includes the video-image-capturing section 100, a mobile-object-candidate-area-detecting section 101, a mobile-object-detecting section 102, and a recording section 103. The video-image-capturing section 100 captures the video image transmitted from the camera 10. The mobile-object-candidate-area-detecting section 101 calculates a candidate area of the mobile object. The mobile-object-detecting section 102 determines whether a mobile-object-candidate captured by the mobile-object-candidate-area-detecting section 101 is a mobile object. Time information etc. is added to the video image captured by the video-image-capturing section 100, and the information and the image are stored in the recording section 103.

The video-image-capturing section 100 converts the video image captured by and transferred from the camera 10 into image data suitable for image recognition process or video recording, and puts out the image data from there. The image data are converted into a one-dimensional array format or a two-dimensional array format. In addition, in order to reduce noise effects and flickering effects, the video-image-capturing section 100 may conduct a pretreatment to the image data such as a smoothing filtering, an edge enhancement filtering, or a concentration conversion etc. The format of the image data is selectable from RGB color format or monochrome format. Alternatively, in order to reduce cost for data processing, the image data may be resized to a predetermined size.

The mobile-object-candidate-area-detecting section 101 conducts a predetermined image-processing to the image data transferred from the video-image-capturing section 100. In this image-processing, the mobile-object-candidate-area-detecting section 101 extracts a candidate area of a mobile object appearing in the video image.

Figure 2:
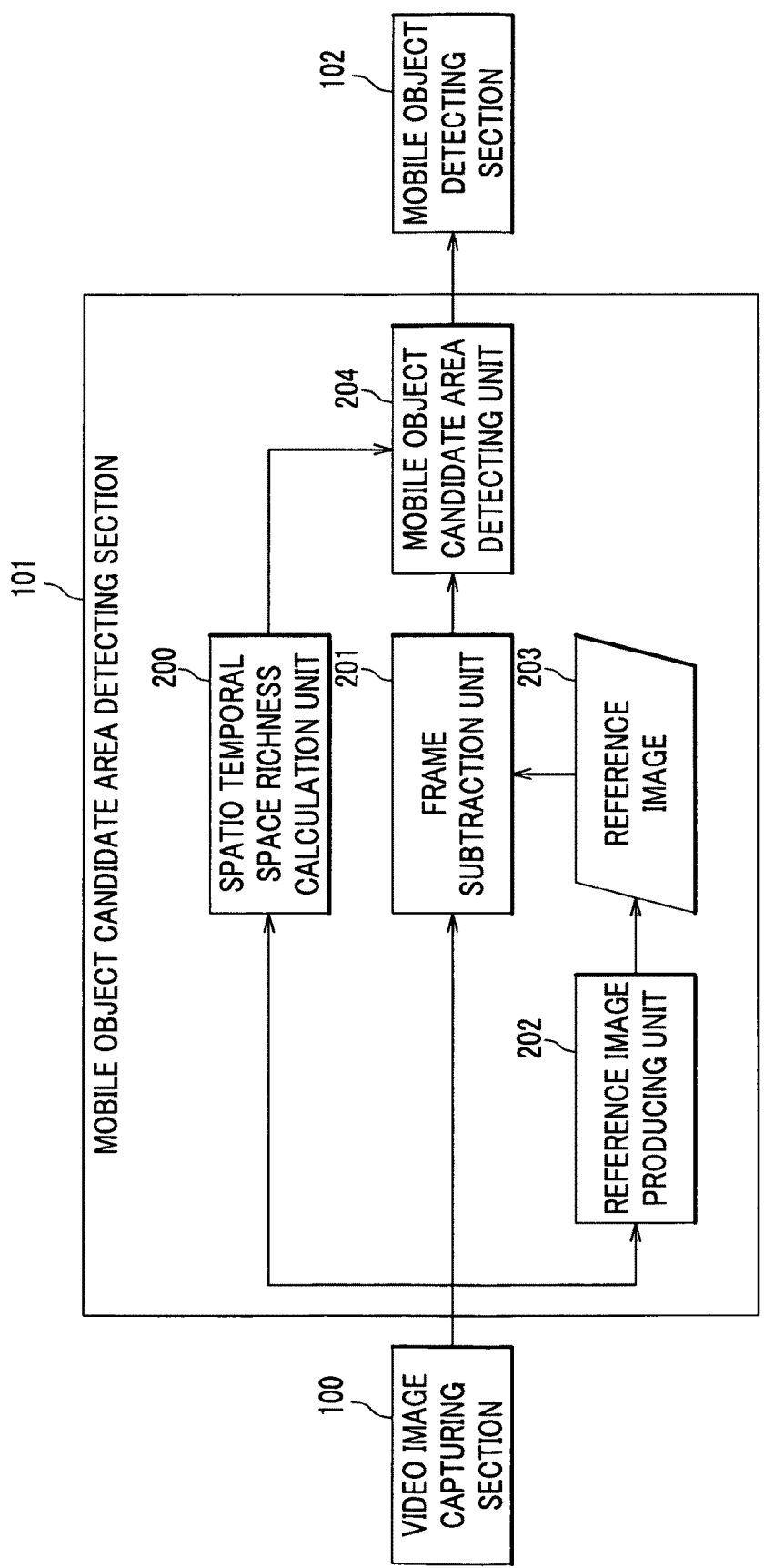
FIG. 2 is a block diagram showing the detail of a mobile-object-candidate-area-detecting section.

FIG. 2 is a block diagram showing the detail of the mobile-object-candidate-area-detecting section 101.

The mobile-object-candidate-area-detecting section 101 includes: a spatio-temporal space richness calculation unit 200; a frame subtraction unit 201; a reference-still-image-producing unit 202 for producing a reference image 203; and a mobile-object-candidate-area-detecting unit 204.

The mobile-object-candidate-area-detecting section 101 conducts image-processing of (1) to (3) follows.

(1) The spatio-temporal space richness calculation unit 200 calculates a spatio-temporal space richness from the image data.

(2) The frame subtraction unit 201 calculates a frame difference between the reference image 203 and an image input thereinto where the reference image 203 is calculated from the image data by the reference-still-image-producing unit 202 or may be calculated previously under a predetermined condition.

(3) The mobile-object-candidate-area-detecting unit 204 calculates a mobile-object-candidate-area by using the spatio-temporal space richness and the frame difference.

The spatio-temporal space richness calculation unit 200 has a function of calculating the spatio-temporal space richness. The spatio-temporal space richness is an example of "spatio-temporal evaluation criteria" recited in claims. The spatio-temporal space richness is obtained by calculating the quantity (entropy) of information in which a direction is encoded.

FIGS. 4A to 4D show a method of direction encodement. FIG. 4A shows an original image. FIG. 4B shows an image which is filtered by an edge enhancement filter. FIG. 4C shows a brightness gradient direction of the image shown in FIG. 4B. FIG. 4D shows a direction code allocated in the brightness gradient direction shown in FIG. 4C.

As shown in FIGS. 4A to 4D, in the process of direction encodement, a brightness gradient of an image is calculated at first, and after that, the brightness gradient is quantized in a predetermined direction and then encoded.

Figure 3:
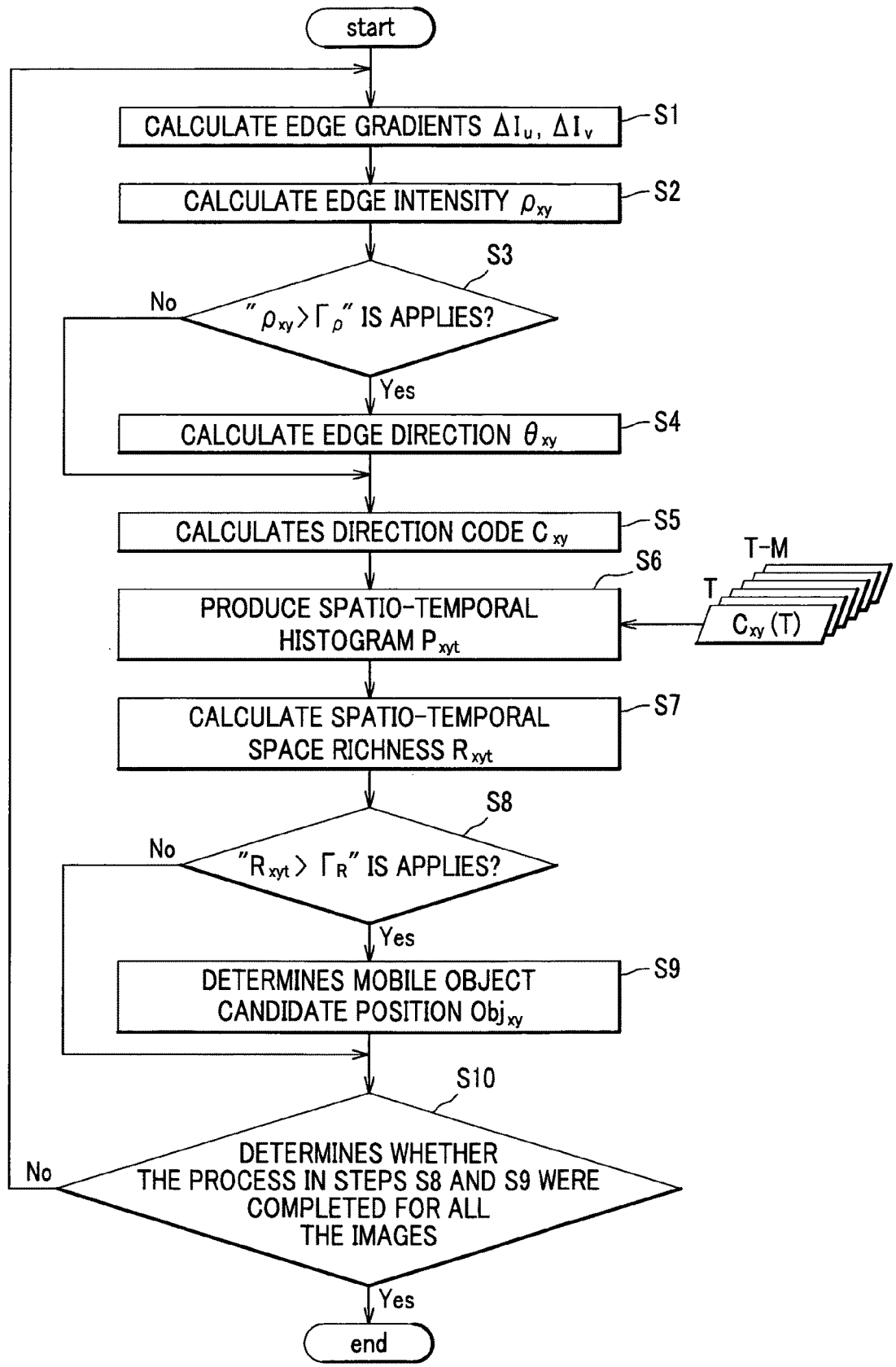
FIG. 3 is a flowchart of processes conducted by a spatio-temporal space richness calculation unit.

FIG. 3 is a flowchart showing processes conducted by the spatio-temporal space richness calculation unit 200.

At first, edge gradients $\Delta I_u$, $\Delta I_v$ of each pixel p (x, y) of an input image $I_{xy}$ in the horizontal direction and in the vertical direction are calculated (step S1).

The edge gradients $\Delta I_u$, $\Delta I_v$ are calculated by using an edge enhancement filter. If a Sobel filter is used as an edge enhancement filter, a calculation coefficient $FLT_h$ in the horizontal direction and a calculation coefficient $FLT_v$ in the vertical direction are represented by Equations (1) as follows. Other edge enhancement filters such as a Prewitt filter may be used instead of the Sobel filter.

[Equation 1]

$$FLT_h = \begin{bmatrix} 1 & 0 & -1 \\ 2 & 0 & -2 \\ 1 & 0 & -1 \end{bmatrix}, FLT_v = \begin{bmatrix} 1 & 2 & 1 \\ 0 & 0 & 0 \\ -1 & -2 & -1 \end{bmatrix} \quad (1)$$

In the next step S2, an edge intensity $\rho_{xy}$ is calculated according to Equation (2) and the edge gradients $\Delta I_u$, $\Delta I_v$ which were calculated by according to Equations (1) showing the filtering method.

[Equation 2]

$$\rho_{xy} = \sqrt{\Delta I_u^2 + \Delta I_v^2} \quad (2)$$

In the next step S3, the spatio-temporal space richness calculation unit 200 determines whether an equation of $\rho_{xy} > \Gamma_\rho$ applies where $\Gamma\rho$ is a predetermined threshold.

If the equation of $\rho_{xy} > \Gamma_\rho$ applies (Yes in step S3), that is, if edge intensity $\rho_{xy}$ is greater than the predetermined $\Gamma\rho$, the spatio-temporal space richness calculation unit 200 calculates an edge direction $\theta_{xy}$ in step S4 and proceeds to the next step S5.

If the equation of $\rho_{xy} > \Gamma_\rho$ does not apply (No in step S3), that is, if edge intensity edge intensity $\rho_{xy}$ is not greater than $\Gamma\rho$, the spatio-temporal space richness calculation unit 200 does not calculate an edge direction $\theta_{xy}$ and proceeds the process to the next step S5.

If the calculated edge intensity $\rho_{xy}$ is low, it can be caused by some pixels being influenced enormously by noise etc. Therefore, in the step S4, the predetermined threshold $\Gamma\rho$ is used not to give a direction code to such pixels. If the spatio-temporal space richness calculation unit 200 determines that the edge intensity $\rho_{xy}$ exceeds the predetermined threshold $\Gamma\rho$ in some pixels p (x, y), the spatio-temporal space richness calculation unit 200 calculates edge directions $\theta_{xy}$ of such pixels p (x, y) according to Equation (3).

[Equation 3]

$$\theta_{xy} = \tan^{-1}(\Delta I_v / \Delta I_u) \quad (3)$$

In the next step S5, the spatio-temporal space richness calculation unit 200 calculates a direction code $C_{xy}$ according to Equation (4) and the calculated edge direction $\theta_{xy}$. If the spatio-temporal space richness calculation unit 200 performs the step S4, that is, if the equation of $\rho_{xy} > \Gamma_\rho$ applies, the direction codes $C_{xy}$ is obtained by calculating a formula $\theta_{xy}/\Delta\theta$. If the spatio-temporal space richness calculation unit 200 does not perform the step S4, that is, if the equation of $\rho_{xy} > \Gamma_\rho$ does not apply, the direction codes $C_{xy}$ becomes equal to $N = 2\pi/\Delta_\theta$.

It should be noted that, in the equation $N = 2\pi/\Delta_\theta$, N is a quantization number obtained by dividing the sum of gradient directions $2\pi$ with $\Delta_\theta$. The quantization number N also indicates the number of direction codes $C_{xy}$ each of which is allocated to each divided gradient direction. For example, if the quantization number N is 16 as shown in FIG. 4D, each direction code $C_{xy}$ is one of 0 (zero) through 15. If the direction code $C_{xy}$ of the pixel p (x, y) is determined to have $\rho_{xy}$ not greater than $\Gamma\rho$ in the step S3, the quantization number N is the greatest integer. For example, if the quantization number is 16 as previously explained, $C_{xy}$ is 16. In this way, if the edge intensity $\rho_{xy}$ is not greater than the predetermined threshold $\Gamma\rho$, the ineffective direction code, e.g. 16 in this embodiment, is given to such a pixel. This concludes the process of direction encodement for image data.

As explained above, the spatio-temporal space richness calculation unit 200 functions as a "direction code calculation unit" recited in claims.

[Equation 4]

$$C_{xy} = \begin{cases} \left[\dfrac{\theta_{xy}}{\Delta_\theta}\right]: & \text{if } \rho_{xy} > \Gamma_\rho \\ N = \dfrac{2\pi}{\Delta_\theta}: & \text{otherwise} \end{cases} \quad (4)$$

Figure 5A:
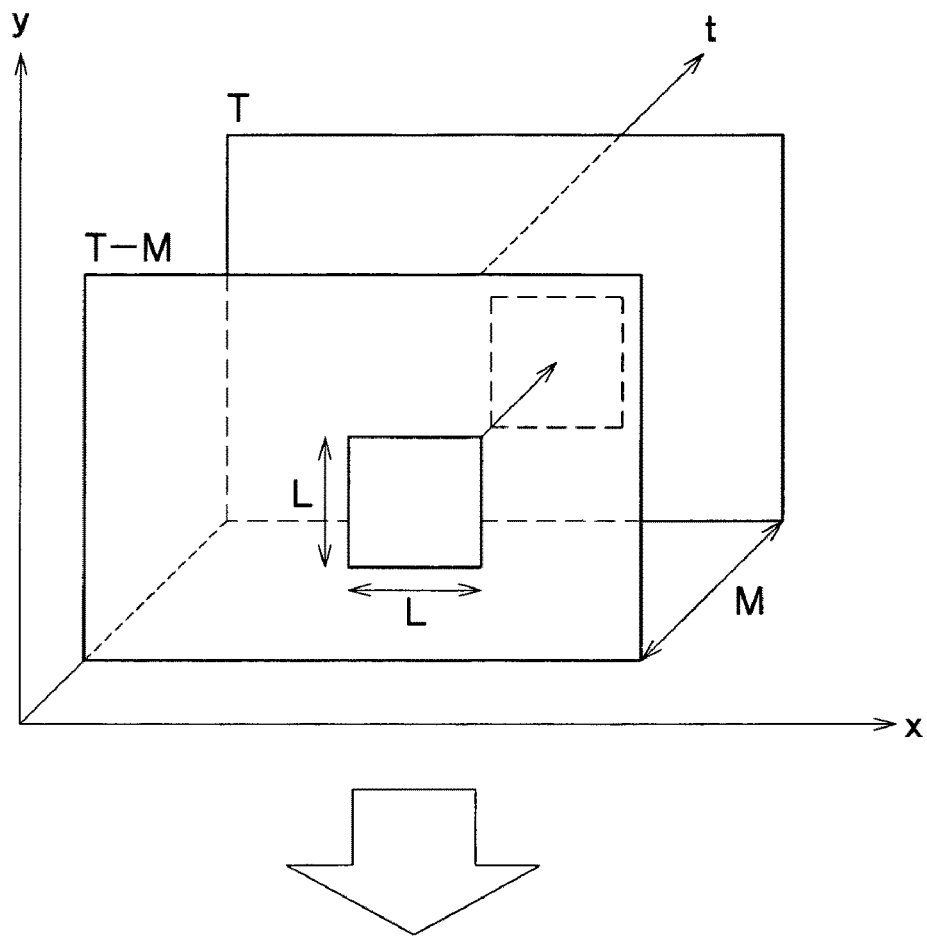
FIG. 5A shows a concept of a spatio-temporal space.
Figure 5B:
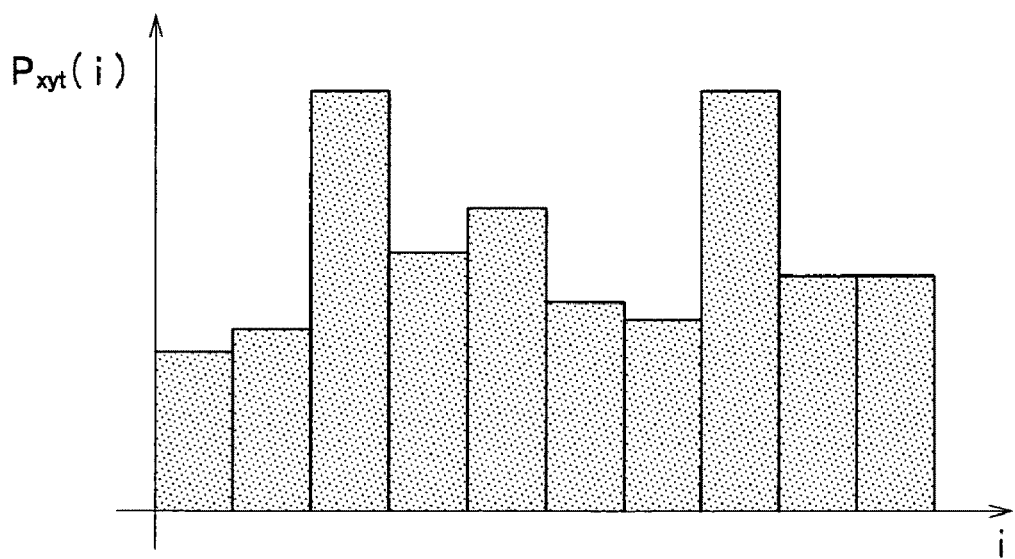
FIG. 5B shows an example of a spatio-temporal histogram in the spatio-temporal space shown in FIG. 5A.

FIG. 5A is a schematic explanation of a spatio-temporal space. FIG. 5B shows an example of a spatio-temporal histogram $P_{xyt}$ of the spatio-temporal space shown in FIG. 5A.

As shown in FIG. 5A, there are M pieces of images, each having an x-y plane, from time T-M to time T in the direction of time t in this spatio-temporal space. Each image has a plane area having a dimension L×L. In this way, a rectangle spatio-temporal space S, not shown in the drawings, is defined by the x-y plane having the dimension L×L and by the temporal length M.

FIG. 5B shows the spatio-temporal histogram $P_{xyt}$ of the space S by calculating the following Equation 5. In this spatio-temporal histogram $P_{xyt}$, the vertical axis represents the frequency at which the direction code $C_{xy}$ appears, and the horizontal axis represents the number of direction codes $C_{xy}$. In FIGS. 5A and 5B, "i" represents the number of direction codes $C_{xy}$.

In the next step S6, the spatio-temporal space richness calculation unit 200 produces the spatio-temporal histogram $P_{xyt}$ showing the frequency at which the direction code $C_{xy}$ appears by using the calculated direction code $C_{xy}$ and a group of direction code $C_{xyt} \in S$ which has been calculated with respect to the space S defined by L×L in the x-y plane and the temporal length M. In order to produce the spatio-temporal histogram $P_{xyt}$, the spatio-temporal space richness calculation unit 200 at first calculates $h_{xyt}$ which represents the frequency at which the direction code $C_{xy}$ appears, according to Equation (5) where δ is Kronecker delta.

[Equation 5]

$$h_{xyt}(i) = \sum_{(x,y,t)\in S} \delta(i - C_{xyt}) \quad (5)$$

Furthermore, the spatio-temporal space richness calculation unit 200 calculates the spatio-temporal histogram $P_{xyt}$, which is represented as relative frequency, by considering: the frequency $h_{xyt}(N)$ at which a pixel, having the edge intensity $\rho_{xy}$ lower than the predetermined threshold $\Gamma_\rho$ and having the ineffective direction code, appears; and the space S, and according to Equation (6).

As explained above, the spatio-temporal space richness calculation unit 200 functions as a "spatio-temporal histogram calculation unit" recited in claims.

[Equation 6]

$$P_{xyt}(i) = \dfrac{h_{xyt}(i)}{L^2 \times M - h_{xyt}(N)} \quad (6)$$

In the next step S7, the spatio-temporal space richness calculation unit 200 calculates a spatio-temporal space richness $R_{xyt}$. In this step, a spatio-temporal entropy $E_{xyt}$ is an evaluation criteria for the spatio-temporal histogram. The spatio-temporal space richness calculation unit 200 determines the maximum entropy $E_{max}$, and then calculates the spatio-temporal space richness $R_{xyt}$. The maximum entropy $E_{max}$ is calculated according to Equation (7). The spatio-temporal entropy $E_{xyt}$ and the spatio-temporal space richness $R_{xyt}$ are calculated according to Equations (8). The symbol $\alpha_e$ shown in Equations 8 represents a weighting coefficient on a threshold value, which is set appropriately in accordance with the feature of an image.

As explained above, the spatio-temporal space richness calculation unit 200 functions as a "spatio-temporal evaluation criteria calculation unit" recited in claims.

[Equation 7]

$$E_{max} = -\sum_{i=0}^{N-1} \dfrac{1}{N} \log_2 \dfrac{1}{N} \quad (7)$$

[Equation 8]

$$E_{xyt} = -\sum_{i=0}^{N-1} P_{xyt}(i) \log_2 P_{xyt}(i) \quad (8)$$

$$R_{xyt} = \begin{cases} \dfrac{E_{xyt} - \alpha_e E_{max}}{E_{max} - \alpha_c E_{max}} & \text{if } E_{xyt} \geq \alpha_e E_{max} \\ 0 & \text{otherwise} \end{cases}$$

If a mobile object appears in front of a background, and if the camera 10 is moved or undergoes rolling, FIG. 6B, i.e. the histogram of the spatio-temporal space richness $R_{xyt}$ shows that pixels p (x, y) located in the space S included in a background area tend to have specific direction codes. That is, in this state, the value of entropy becomes smaller.

In contrast, the spatio-temporal space richness $R_{xyt}$ becomes higher if the direction codes are detected in various directions as shown in FIG. 6A, e.g. if a person etc. moves in a video image. That is, in this state, the value of entropy becomes greater.

The spatio-temporal space richness calculation unit 200 makes use of this principle to separate the mobile object from the background area. That is, in step S8, the spatio-temporal space richness calculation unit 200 determines whether an equation $R_{xyt} > \Gamma_R$ applies. In the present embodiment, ΓR is a threshold predetermined for the spatio-temporal space richness $R_{xyt}$.

If the spatio-temporal space richness calculation unit 200 determines that the equation $R_{xyt} > \Gamma_R$ applies (Yes in step S8), i.e. if the spatio-temporal space richness calculation unit 200 detects a mobile object, the spatio-temporal space richness calculation unit 200 determines the position of a mobile-object-candidate in the next step S9, and then proceeds to the next step S10. More specifically, in the step S9, the spatio-temporal space richness calculation unit 200 determines that, if a pixel p (x, y) exceeds the predetermined threshold Γρ, such pixel is included in the spatio-temporal space richness $R_{xyt}$ and constitutes a mobile object candidate position $Obj_{xy}$.

If $R_{xyt} > \Gamma_R$ does not apply (No in step S8), the spatio-temporal space richness calculation unit 200 proceeds the process to the next step S10.

In the step S10, the spatio-temporal space richness calculation unit 200 determines whether the process in the steps S8 and S9 were completed for all the images.

If the spatio-temporal space richness calculation unit 200 determines that the process in the steps S8 and S9 were completed for all the images (Yes in step S10), the spatio-temporal space richness calculation unit 200 finishes the process shown in FIG. 3.

If the spatio-temporal space richness calculation unit 200 determines that the process of the steps S8 and S9 were not completed for all the images (No in step S10), the spatio-temporal space richness calculation unit 200 repeats the process for non-processed pixels.

In this manner, the spatio-temporal space richness calculation unit 200 conducts these processes S1 to S10 on all the pixels of the images existing in the space S.

Returning to FIG. 2, a process conducted by the frame subtraction unit 201 will be explained. In the present embodiment, a widely known method i.e. a frame difference method is used for calculating a candidate area of the mobile object. For example, in the frame difference method, a difference is obtained between image data in one frame and image data in a preceding frame at first, and then, an inter-frame change of the images occurring in the short period is detected. After that, the candidate area of the mobile object is calculated. In this method, the accuracy in calculating the candidate area of the mobile object can be improved. Other methods such as histogram matching and image-processing technique such as optical flow etc. may be used for calculating the candidate area of the mobile object.

At first, prior to processing with the frame subtraction unit 201, the reference-still-image-producing unit 202 produces a reference image 203 from the preceding image data. (Otherwise, the reference image 203 should be prepared in advance.) In order to reduce workload, the preceding image is used as the reference image 203 in the present embodiment. The frame difference method is also advantageous for deleting an obviously recognizable background area since this method detects the mobile object candidate area and noise. A frame difference $Sub_{xy}$ is obtained by using an equation as follows:

$$Sub_{xy} = |B_{xy} - I_{xy}| (\text{if } Sub_{xy} > \Gamma_{sub})$$

where $B_{xy}$ represents the reference image 203; and where $SuB_{xy}$ represents a binarized image obtained by conducting a process using a threshold $\Gamma_{sub}$.

A process conducted by the mobile-object-candidate-area-detecting unit 204 will be explained next. At first, an $Obj_{xy}$ is calculated by using the spatio-temporal space richness calculation unit 200 and the frame subtraction unit 201. As shown in Equation (9), a mobile object candidate area $D_{xy}$ is a logical conjunction (AND) of the area having a higher spatio-temporal space richness and the area having a greater frame difference value. As a result, the mobile object candidate area $D_{xy}$ is equal to spatio-temporal space richness $R_{xyt}$ of the candidate area of the mobile object.

[Equation 9]

$$D_{xy} = Obj_{xy} \wedge Sub_{xy} \qquad (9)$$

Figure 7:
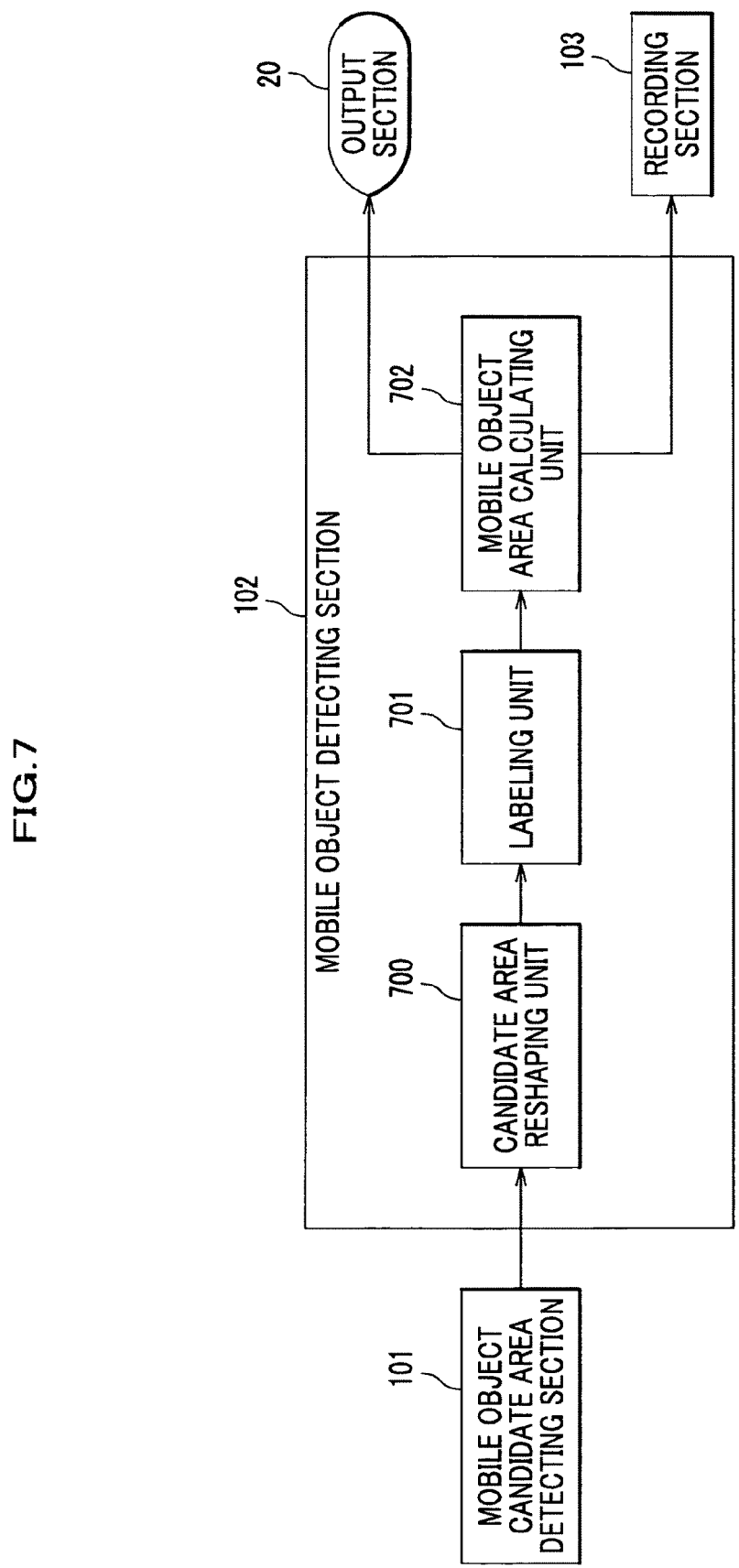
FIG. 7 is a block diagram showing the detail of a mobile-object-detecting section.

FIG. 7 is a block diagram showing the detail of the mobile-object-detecting section 102.

The mobile-object-detecting section 102 includes a candidate-area-reshaping unit 700, a labeling unit 701, and a mobile object area calculating unit 702.

As previously explained, the mobile object candidate area $D_{xy}$ has already been calculated. At first, the candidate-area-reshaping unit 700 conducts a process of reshaping the mobile object candidate area $D_{xy}$. If the mobile-object-detecting section 102 determines that the candidate of the mobile object is a human, the mobile-object-detecting section 102 conducts a filtering to the entire image data by using, for example, a Gaussian filter G having an elongate window of G=(10×20). It is thus preferable to conduct the reshaping process in consideration of the size (area, dimension etc.) or the shape of the mobile object which is to be detected; and information regarding the space in which a video image is captured (e.g. information regarding the field of view of the camera 10). Equation 10 shows a reshaping process, i.e. a process of binarizing the candidate area.

[Equation 10]

$$Bin_{xy} = \begin{cases} 1 & \text{if: } G*D_{xy} > thr \\ 0 & \text{otherwise} \end{cases} \qquad (10)$$

After that, the labeling unit 701 conducts a labeling process on the $Bin_{xy}$ of each mobile object, and then calculates a rectangle region and the area of the labeled mobile object.

The mobile object area calculating unit 702 has thresholds predetermined for an area and an aspect ratio etc. set based on information regarding the camera install condition and on information regarding an object to be detected. The mobile object area calculating unit 702 maintains an area which is to be detected and removes noise.

The mobile object area calculating unit 702 puts out the calculated area of the mobile object to the output section 20 and the recording section 103. The output section 20 can put out a rectangle area etc. of the mobile object. The recording section 103 can be controlled to record a video image only when detecting a trespasser.

Figure 8:
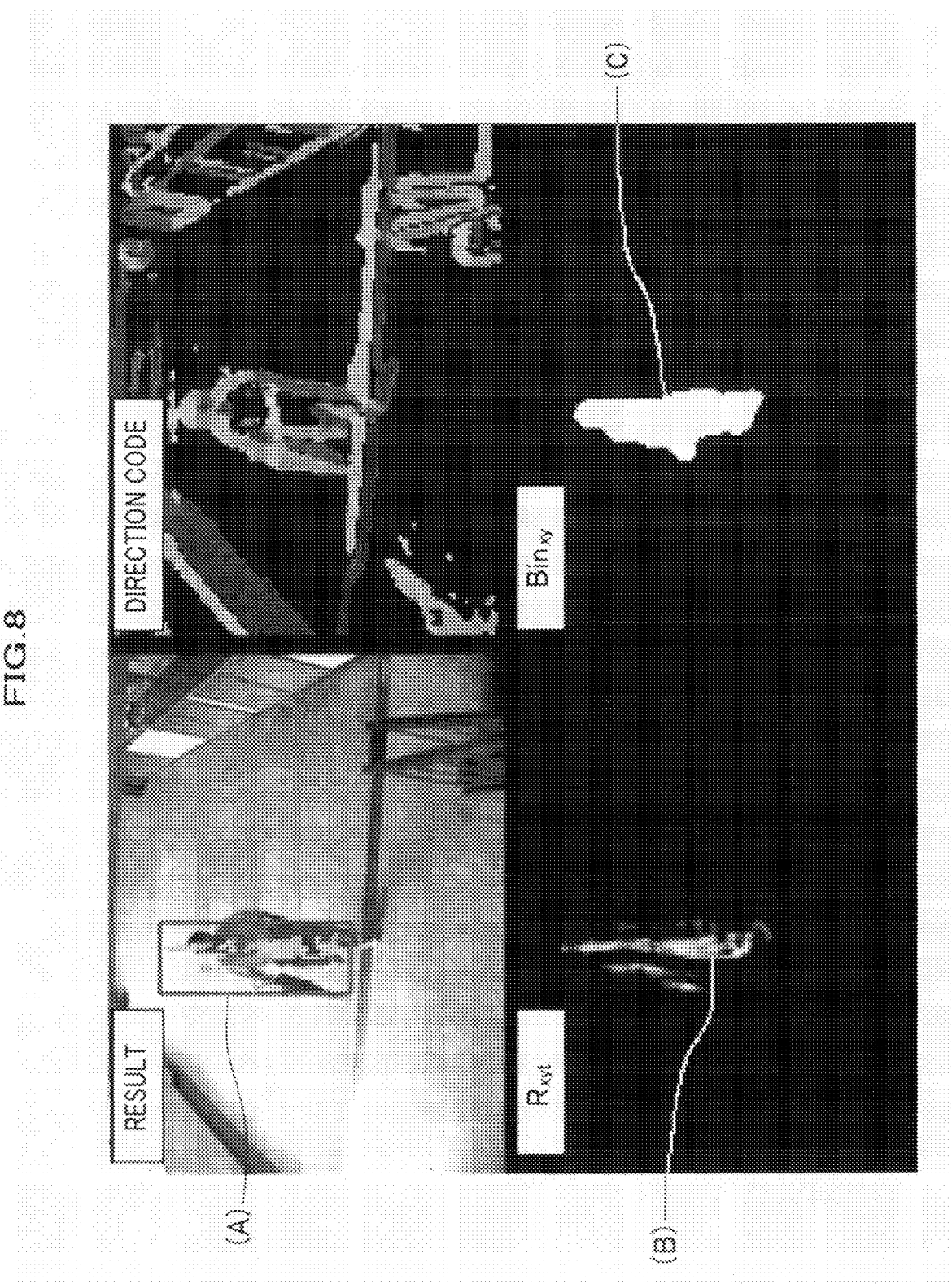
FIG. 8 shows an example of an outputted image according to the present embodiment.

FIG. 8 shows examples of images put out according to the present embodiment.

The upper left window is an output image showing a rectangle area surrounding a person. The upper right window shows an image of visualized direction codes. The lower left window shows an image obtained by conducting the Gaussian filter G to the spatio-temporal space richness $R_{xyt}$. This output represents the candidate area of the mobile object constituting the pixels having the spatio-temporal space richness $R_{xyt}$ exceeding the predetermined threshold. The lower right window is a binarized image obtained by conducting a process of labeling the candidate area of the mobile object, in which a portion (C) indicates the result of the labeling process. Although a video image inputted thereinto is trembling a little in this image, the area of a person, i.e. mobile object is successfully detected.

INDUSTRIAL APPLICABILITY

The present invention can provide a video image monitoring system which can effectively detect a mobile object appearing in a captured video image by controlling a background image and other camera condition which change continuously and by adopting a spatio-temporal space richness for calculating the change in the direction code in the spatio-temporal space.

EXPLANATION OF REFERENCE

1: video image monitoring system
10: camera (image-capturing device)
20: output section
30: recording medium
40: image recognition device
100: video-image-capturing section
101: mobile-object-candidate-area-detecting section
102: mobile-object-detecting section
103: recording section
200: spatio-temporal space richness calculation unit 201: frame subtraction unit
202: reference-still-image-producing unit
203: reference image
204: mobile-object-candidate-area-detecting unit
700: candidate-area-reshaping unit
701: labeling unit
702: mobile object area calculating unit

What is claimed is:

1. A video image monitoring system comprising:
a video-image-capturing section configured to put out image data based on a video image signal obtained by using an image-capturing device;
a mobile-object-candidate-area-detecting section configured to extract a candidate area of a mobile object from the image data; and
a mobile-object-detecting section configured to determine whether the candidate area is the mobile object,
wherein the mobile-object-candidate-area-detecting section comprises:
a direction code calculation unit configured to calculate a direction code obtained by quantizing a brightness gradient direction of the image data;
a spatio-temporal histogram calculation unit configured to calculate a spatio-temporal histogram which represents a frequency of the direction code appearing in a predetermined spatio-temporal space; and
a spatio-temporal space evaluation value calculation unit configured to calculate a statistical spatio-temporal space evaluation value of the spatio-temporal histogram, and wherein the mobile-object-detecting section is configured to determine whether the candidate area is the mobile object based on the spatio-temporal space evaluation value.

2. The video image monitoring system according to claim 1, wherein the spatio-temporal space evaluation value calculation unit is configured to calculate an entropy of the spatio-temporal histogram as the spatio-temporal space evaluation value.

3. The video image monitoring system according to claim 1, wherein the mobile-object-candidate-area-detecting section has a frame difference unit configured to calculate a frame difference from a reference image, and wherein the mobile-object-candidate-area-detecting section is configured to detect the mobile object by evaluating the result of the candidate area together with the frame difference.

4. The video image monitoring system according to claim 1, wherein the mobile-object-detecting section has a candidate-area-reshaping unit configured to reshape the candidate area by considering the size of the mobile object to be detected or information regarding the space in which a video image is captured.

5. The video image monitoring system according to claim 3, wherein the mobile-object-candidate-area-detecting section has a reference-still-image-producing unit configured to produce the reference image based on the image data supplied from the video-image-capturing section.

* * * * *